Jan. 16, 1968     C. O. MERCHANT ET AL     3,363,298

CRT COLOR GUN POSITIONING AND ASSEMBLY JIG

Original Filed June 10, 1966     3 Sheets-Sheet 1

INVENTORS
CHESTER O. MERCHANT
JAY H. JOHNSON

BY Watson, Cole, Grindle & Watson

ATTORNEYS

Jan. 16, 1968   C. O. MERCHANT ET AL   3,363,298
CRT COLOR GUN POSITIONING AND ASSEMBLY JIG
Original Filed June 10, 1966                        3 Sheets-Sheet 2
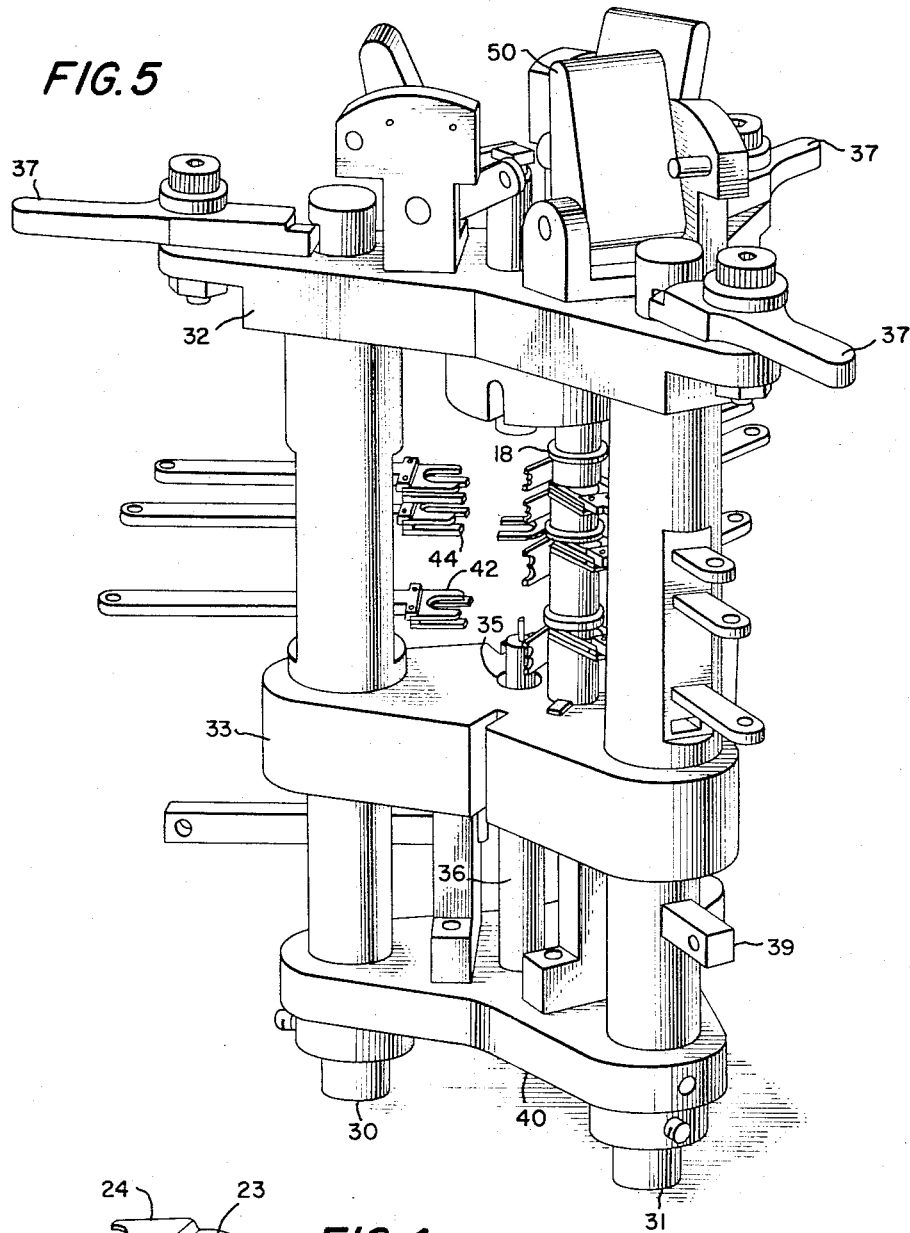
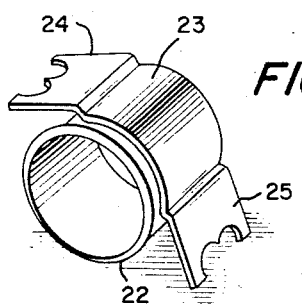
INVENTORS
CHESTER O. MERCHANT
JAY H. JOHNSON
BY *Watson, Cole, Grindle & Watson*
ATTORNEYS Jan. 16, 1968     C. O. MERCHANT ET AL     3,363,298

CRT COLOR GUN POSITIONING AND ASSEMBLY JIG

Original Filed June 10, 1966     3 Sheets-Sheet 3

INVENTORS
CHESTER O. MERCHANT
JAY H. JOHNSON

BY Watson, Cole, Grindle & Watson
ATTORNEYS

United States Patent Office 3,363,298
Patented Jan. 16, 1968

3,363,298
CRT COLOR GUN POSITIONING AND
ASSEMBLY JIG
Chester O. Merchant and Jay H. Johnson, Owensboro,
Ky., assignors to Kentucky Electronics, Inc., Owensboro, Ky., a corporation of Delaware
Original application June 10, 1966, Ser. No. 556,654. Divided and this application Jan. 10, 1967, Ser. No. 608,420
8 Claims. (Cl. 29—25.19)

ABSTRACT OF THE DISCLOSURE

This disclosure relates to a manually loaded mounting jig for holding electrodes for a three gun color cathode ray tube in alignment during assembly and fixing in place with a molten glass bead. Thus, a series of substantially cylindrical electrodes is stacked upon three separate sets of internal vertically disposed assembly posts and held in axially spaced positions by laterally movable spacer means with gauges inserted between two adjacent electrodes. These spacer means also serve by means of a set of fingers extending therefrom as alignment means for adjusting straps or brackets which are affixed to the electrodes with arms extending on opposite sides of the cylindrical electrodes so that the arms of the brackets are symmetrically disposed to receive three molten glass beads for permanently holding the electrodes affixed in alignment. The complete assembly of electrodes is clamped into place between two limiting platforms at least one of which is apertured to permit the internal posts to be removed so that a manufactured gun may be removed by unclamping the gun without significant disassembly of the jig. The assembly posts are placed at the proper angle to provide a convergence angle between the three color guns. The jig is mounted upon three symmetrically disposed posts extending through the platforms which posts hold the series laterally movable spacer means for individually sliding in and out of engagement with the electrodes. The molten glass beads are inserted in the windows between each two adjacent posts and the jig may be held in place for this operation by apertures or slots receiving the three posts.

---

This is a divisional application of the parent case, Ser. No. 556,654, filed June 10, 1966, for Color Gun Assembly Means and Methods.

This invention relates to jigs used in the assembling of cathode ray tube electrodes and, more particularly, to jigs used in the assembly of three gun color television tube electrodes.

Because of the many different electrodes which must be carefully matched and spaced to produce the precision required for color guns, the state of the art heretofore resulted in a high percentage of rejects and cumbersome and time consuming assembly techniques with many separate operations.

It is difficult to assemble color guns because the beam axes are precisely oriented at a slight convergence angle. This prevents extension of conventional techniques of assembling single beam guns into a unitary three beam gun assembly.

Accordingly, it is an object of this invention to provide comprehensive special equipment for efficient assembling and beading of the various electrodes into a three beam electron gun.

An object of the invention is to provide means for positioning and assembling to produce a firm and precise final orientation of the electrodes for receiving a molten glass bead.

Another object of the invention is to provide a jig for holding the various electrodes in a converged relationship which nevertheless permits quick release of a completed gun rigidly held in place by glass beads.

The jig provided by this invention has three stems held in proper convergence relationship to internally mate with the electrodes along the respective beam axes of the three guns, while the beads are inserted, but fashioned for ready removal from the electrodes without binding because of the convergence angles.

Special jig members are provided for spacing and orienting the electrodes precisely without significantly interfering with the procedure of loading the electrodes in position.

Thus, the loading jig is easily removed from the beading machine, and the finished gun assembly is readily removed from the jig by simple linear motion in retraction of spacers and mounting cams used to clamp the individual electrodes in place for beading.

The electrodes are loaded at one end upon a set of three stems extending from a lower platform at a convergence angle. Spacers are inserted between adjacent electrodes by linear motion through three peripheral mounting posts framing the lower platform and serving to receive a removable upper platform holding the stems in place for axial frictional clamping of the electrodes in place with axial pressure on the stems.

The invention is described in more detail in the following specification with reference to the various views in the accompanying drawings, wherein:

FIGURE 4 is a perspective view of an electrode having a mounting strap thereon;

FIGURE 5 is a perspective view of a jig assembly upon which the individual electrodes are assembled during manufacture;

The electron gun

Figure 1:
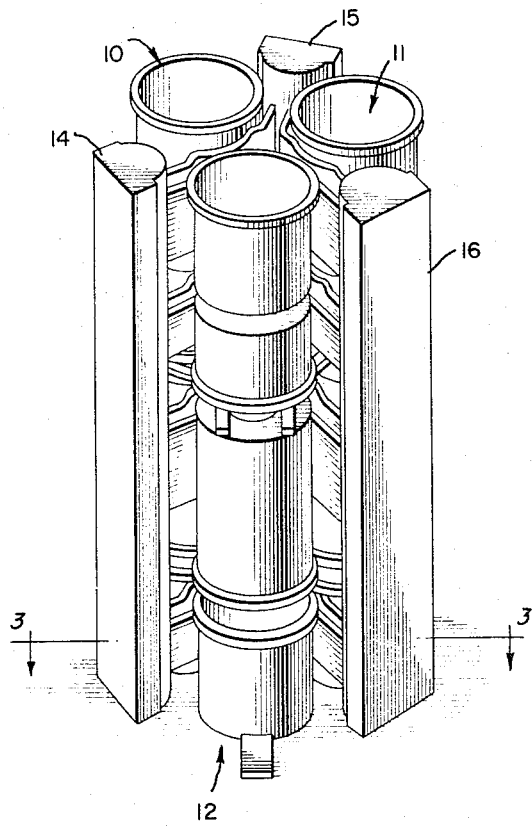
FIGURE 1 is a perspective view of a three beam electron gun assembly for a color tube.

Referring now particularly to the view of FIGURE 1, the electron gun assembly provides for the three beams of a color tube with three respective stacks of electrodes 10, 11, and 12, which are respectively aligned with their axes at a slight convergence angle in order to provide the merger of the three electron beams at one position in the vicinity of a shadow mask array which is placed near a color screen. The three sets of electrodes are held in position by means of three glass beads 14, 15, and 16, which are positioned in between each pair of electron gun assemblies in order to receive embedded therein mounting straps from the individual electrodes to hold them firmly in place.

Figure 2:
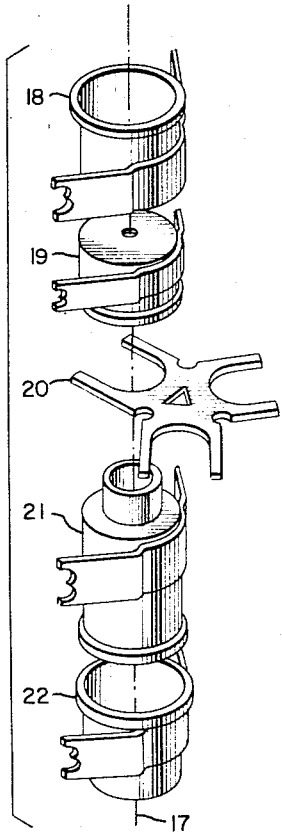
FIGURE 2 is an exploded view of the electrodes aligned along the beam axis.
Figure 3:
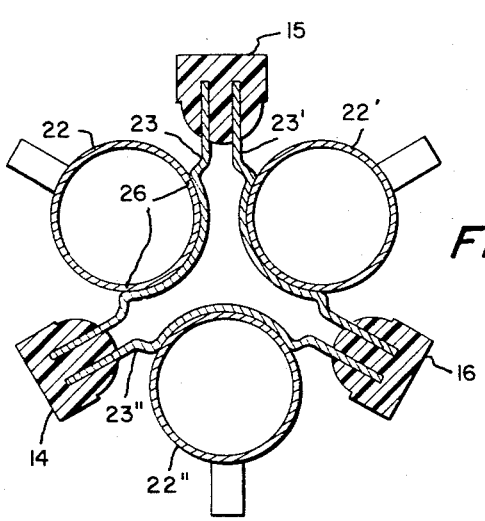
FIGURE 3 is a cross section view of the three gun assembly of FIGURE 1 taken along lines 3—3.

The individual array of the electrodes may vary with different electron gun designs, but a typical embodiment is shown in exploded form in FIGURE 2 wherein the electron beam axis 17 is shown along which various electrodes are concentrically arranged. In this array, starting from the top, the electrodes may be a first control grid 18, a second control grid 19, a connector strap 20 positioned between control grid 19 and the focusing electrode 21, and an accelerating anode 22. As shown in FIGURES 3 and 4, each electrode has welded thereon a mounting bracket 23 which has arms 24 and 25 extending substantially tangentially from the cylindrical portion of the electrode on opposite sides of a segmental portion 26 of the electrode. The respective arms 24 and 25 are paired and embedded at spaced positions into the glass beads 14, 15, and 16, to hold the electrodes firmly in position as shown in FIGURES 1 and 3.

The gun jig

Figure 6:
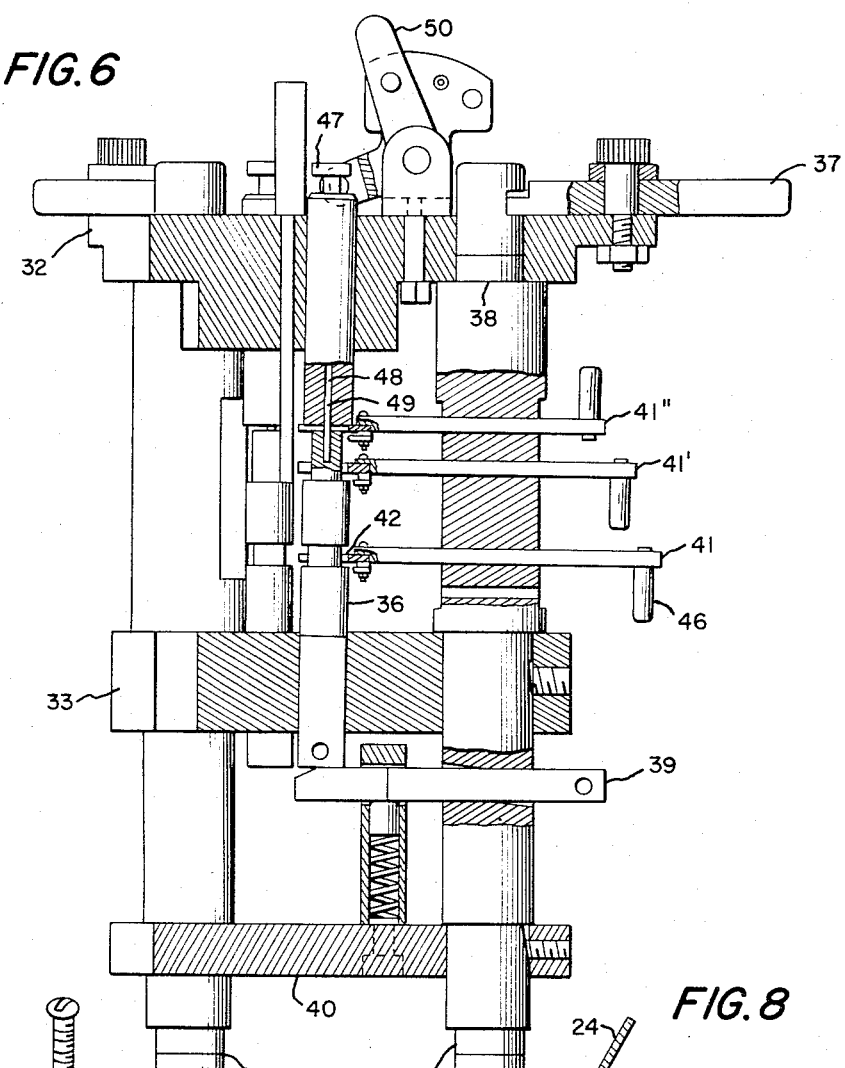
FIGURE 6 is a side view, partially in section, of the jig assembly of FIGURE 5.

In order to hold these electrodes in appropriate position during assembly before inserting the glass beads 14, 15, and 16 upon the bracket arms, the jig array of FIGURES 5 and 6 is provided. In general, this jig has three sectors for the respective gun assemblies, each related to a different mounting post 30, 31, etc. which are laid out in a generally triangular array held by alignment platforms 32 and 33. Each of these alignment platforms have apertures 35 drilled to receive a set of three stems 36 having thereon a series of substantially cylindrical surfaces shaped to mate internally in the plurality of electron gun electrodes aligned along each beam axis. The angle of the apertures 35 drilled through the alignment platforms 32 and 33 is such that the three stems hold the electron beam axes at the proper convergence angle.

The upper platform 32 is removable from the posts 30, 31 by means of levers 37 which turn to lock into notches 34 on the topmost section of the posts 30 and 31. As may be seen from FIGURE 6, the top platform 32 seats upon the shoulder 38 when the clamping levers 37 are in place upon the reduced topmost diameter of the mounting shafts 30 and 31. In this manner, the entire top assembly may be removed to provide access to the upper end of the three stems 36 to permit placement of the individual electrodes thereon. In order to place the electrodes upon the stems they are held in an uppermost position extending through the upper side of the platform 33 by means of the sliding cam 39 extending through one of the posts 30, 31 underneath the alignment platform 33. The sliding cam 39 may be removed after the guns are supplied with the glass beads to permit the stem assembly 36 to fall in the lowermost position as shown in FIGURE 5 extending through the lower side of platform 33 and resting upon a lower platform stop 40. In this position, the completed electron gun assembly having all the elements held together by the beads may be removed from platform 33 without binding because of the convergence angle of the three stems which snugly fit inside the electrodes.

Figure 7:
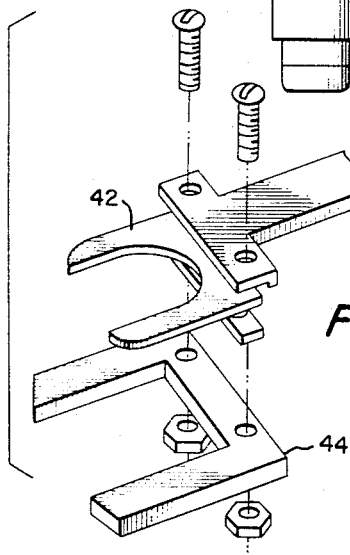
FIGURE 7 is an exploded view of an electrode spacer subassembly used in the jig of FIGURES 5 and 6.
Figure 8:
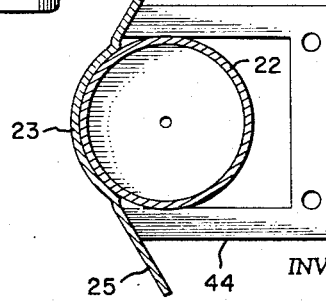
FIGURE 8 is a top view, partially in section, of an electrode and alignment member as finally positioned in the jig assembly of FIGURE 5.

As each electrode is placed in position sequentially upon the corresponding cylindrical portion of the stem 36, it is spaced along the beam axis from the next electrode the proper distance by means of an independently movable spacer 41 which is slid through a bearing channel in the appropriate mounting post 30, 31 to come up in contact with the stem around the appropriate cylindrical portion with a forked spacer member 42 as seen in the exploded view of FIGURE 7. The inserted spacer member serves the additional functional purpose of aligning the brackets 23 upon the electrodes into their symmetrical position for receiving the bead as illustrated in FIGURE 3 by operation of the bracket aligning member 44 which straddles the electrode and engages the respective arms 24 and 25 of the bracket 23 to position them in the manner illustrated by FIGURE 8. In the view of FIGURE 6 the bracket alignment member 44 is broken away and the spacer member 42 is shown in section to illustrate the manner in which it engages the cylindrical shaft position on the mounting stem 36 when it is pushed into its innermost position by means of the handle 46.

As may be seen from FIGURES 5 and 6, the independently moved spacer assemblies are in position between the various electrodes which are mounted upon the stems and are appropriately clamped in position after the stem is mated in apertures in the top alignment platform 32. The uppermost electrode which is the first control grid 18, fits around an interfitting extension of the stem which is held in bearing position in the corresponding aperture in the upper alignment platform 32. This interfitting piece of the stem 47 has an internal aperture 48 which interfits with the pin 49 upon the stem 36. The pin 49 serves to align the two grid holes in grid electrodes 18 and 19 so that the upper stem member 47 may be inserted into the top of the inverted first control grid 18 in final assembly position. Thus, all the cylindrical sections on the stem 36 are of decreasing diameter toward the top of the stem so that the stem 36 may drop out of the assembled gun, when cam 39 is slipped out from under the lower extension of stem 36.

In the final position these grid stems are locked into place by means of spring pressure on the cammed tightening lever members 50 which have one arm pinned into the top of the stem extension 47 to thereby press fit the stem upon the uppermost grid electrode 18 to hold all electrodes firmly in place in their final axial position with the appropriate spacing and proper mounting bracket alignment. After the bead is inserted through access passageways extending between each two adjacent guns in the area way between the mounting rods 30 and 31 into which the mounting bracket arms extend in symmetrical position, the top alignment platform 32 is removed after removing the spring pressure on the clamping cams 50. Then, with the pressure released from the electrodes and stems, the cam sliders 39 are retracted to let each of the mounting stems 36 drop into contact with the limiting platform 40 so that the completed assembled electron gun assembly may be removed. Then the jig may be repositioned for assembly of a new electron gun assembly by repositioning of the stems 36 upon the slider cams 39 in the position as shown in FIGURE 6.

Having therefore described the invention, its structural organization, and mode of operation, those novel features believed descriptive of the scope and nature of the invention are defined with particularity in the appended claims.

What is claimed is:

1. A positioning and assembling jig for holding the electrodes of a three beam electron gun during manufacture, comprising in combination, a set of three stems aligned along each beam axis providing a series of substantially cylindrical surfaces shaped to mate internally in a plurality of electron gun electrodes, separate alignment means holding the stems in position at each end skewed enough to define converging axes of the respective beams, removable mountings on the first of said alignment means holding the stems in position to provide axial access to the three stems from one end for placing thereon a plurality of sets of three similar electrodes in mating position with the cylindrical surfaces on respective ones of said stems, and mountings including three parallel posts substantially parallel to the stems, three spaced platforms affixed to the posts at spaced positions, two being near the ends of the posts and one being an intermediate position, two adjacent ones of the platforms having three alignment apertures therein to receive said stems, with the apertures aligned to orient the stems at a proper convergence angle thereby constituting said separate alignment means, each of said posts holding a set of independently movable spacers laterally movable therein radially toward said stems from a limiting position away from said stems to another in contact with the stems for positioning between the different sets of similar electrodes to provide between adjacent electrodes a predetermined axial spacing of the electrodes along the beam path.

2. The apparatus defined in claim 1 for processing electrodes with brackets thereon wherein said movable spacers have at the inner end generally U-shaped members with two extending arms (including means) extending around each electrode when mounted on the stems with the ends tapered to contact the brackets on opposite sides of the electrodes and hold them in symmetrical position.

3. The apparatus defined in claim 1 wherein the means for holding the stems in position comprise said platforms wherein the apertures constitute bearing surfaces placed therein at an angle establishing the convergence angle between the three stems, and including bearing surfaces at each end of said stems snugly fitting therein.

4. The apparatus defined in claim 3, with one set of apertures on a corresponding platform larger than the cylindrical surfaces of the stem, and including structure holding the stems in two different alignment positions by permitting axial motion through the latter set of apertures and removable locking means for precisely holding the stems extending through the alignment means in assembly position with the bearing surfaces mated in one of said positions and alternatively for releasing the stems for removal through the platform from a completed gun assembly to free the gun assembly for removal from the jig.

5. Apparatus as defined in claim 4, wherein at least one of the electrodes has a grid hole, and each of the stems has two interfitting portions including a pin serving to align at least said one grid hole in a space between the two interfitting stem portions, wherein one of the stem portions is held during said axial motion of the other stem portion.

6. An assembling jig for positioning and holding in position during assembly and manufacture the cylindrical electrodes of a three beam electron gun which have mounted thereon straps with substantially tangential arms extending from two sides of a segmental portion of the cylinder (in position during manufacture) comprising in combination, a holder comprising a set of three platforms mounted on three parallel posts, and including stems journalled in apertures in the platforms for holding and (for) positioning and aligning the separate electrodes of the three guns in properly spaced positions with the straps from separate guns having arms adjacent each other in the space between the three guns, and a set of movable spacers, each insertable between adjacent electrodes and carrying a further generally U-shaped member with ends of its extended legs (shafts having fingers) extending adjacent each side of the cylindrical electrodes and tapered to engage and to symmetrically position the arms of all three guns for receiving a glass bead to hold the electrodes in final assembly position.

7. An assembling jig for positioning and holding the electrodes of a three beam electron gun in position during assembly and manufacture comprising in combination, a set of three stems for extending inside of a plurality of electrodes along each of three beam axes which converge at a predetermined angle, at least two spaced and fixed platform means having apertures therein receiving and orienting the three stems, one platform permitting removal of the stems (removably) through apertures therethrough at the end at which the stems are farthest apart, an additional limiting platform, means holding the stems at two selectable positions to extend through the apertures on opposite sides of said one platform, with structure holding the stems in assembled position inside the electrodes and movable to release the stems from the electrodes by moving the stems to the opposite side of said one platform to rest against said limiting platform thereby permitting removal of an assembled gun.

8. A jig as defined in claim 7 wherein the two platforms are held in spaced position by three mounting posts extending therethrough, and including means for holding the jig in position for receiving molten glass beads to hold the electrodes in place comprising a guide for receiving and mating with end portions of two of said posts extending through the platforms and a lever clamp for selectively engaging the remaining end portion to forcibly seat the jig in a fixed working position.

References Cited

UNITED STATES PATENTS

| | | | |
|---|---|---|---|
| 2,390,139 | 12/1945 | Vasselli | 29—25.19 X |
| 2,871,621 | 2/1959 | Hanson et al. | 269—37 |
| 2,876,554 | 3/1959 | Reynard | 33—181 |
| 2,914,317 | 11/1959 | Miller et al. | 269—40 |
| 2,919,128 | 12/1959 | Blattel et al. | 269—40 |
| 3,289,268 | 12/1966 | De Bernardis | 29—203 X |

THOMAS H. EAGER, *Primary Examiner.*